Feb. 21, 1956     J. H. WILSON     2,735,582
APPARATUS FOR DISTRIBUTING COMMINUTED MATERIAL
Filed May 6, 1953
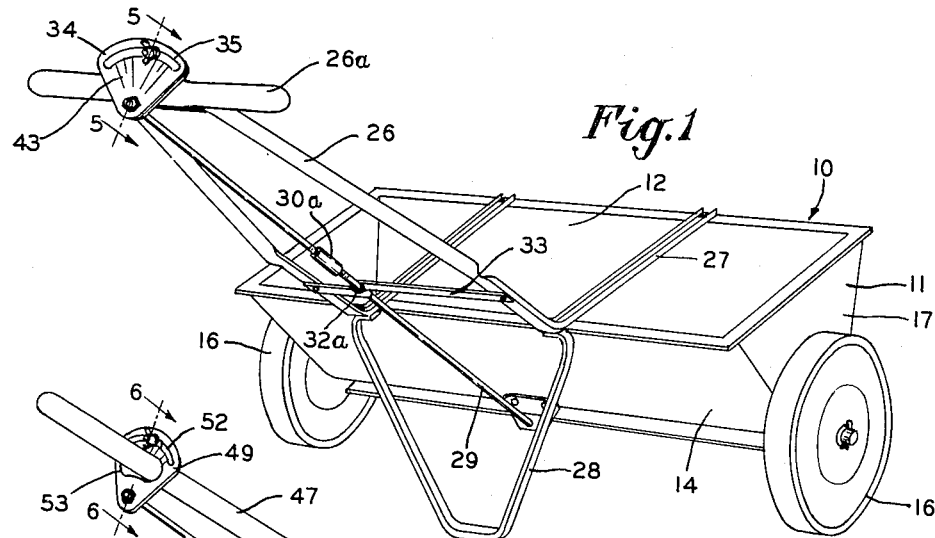
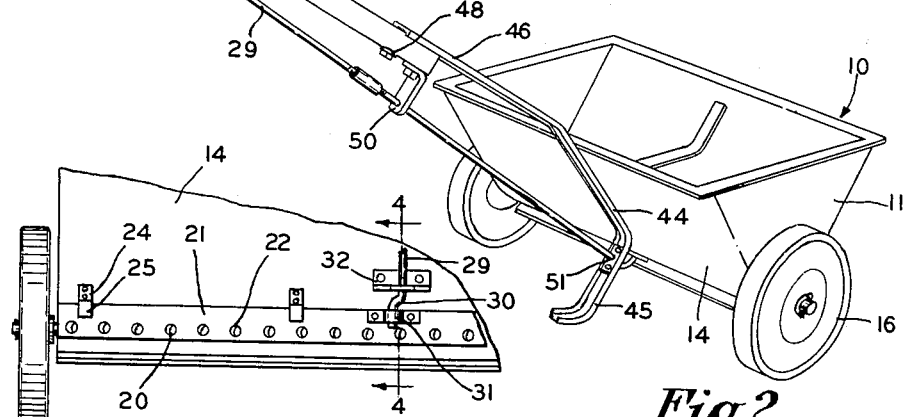
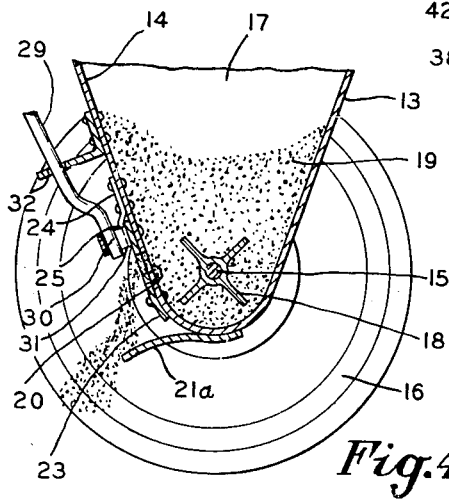
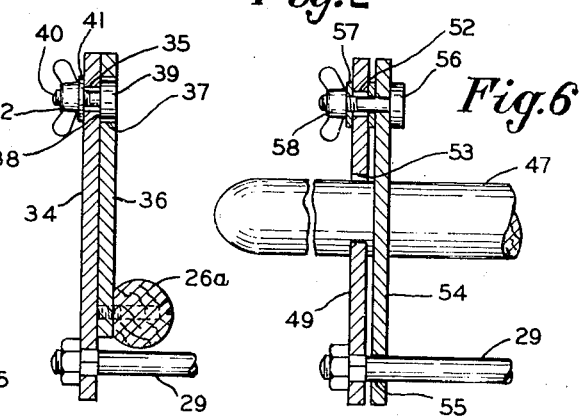
INVENTOR.
James H. Wilson
BY
Frease & Bishop
ATTORNEYS United States Patent Office 2,735,582
Patented Feb. 21, 1956

2,735,582

APPARATUS FOR DISTRIBUTING COMMINUTED MATERIAL

James H. Wilson, Salem, Ohio, assignor to The Salem Tool Company, Salem, Ohio, a corporation of Ohio Application May 6, 1953, Serial No. 353,259

10 Claims. (Cl. 222—43)

My invention relates to a hand wheeled vehicle apparatus for uniformly distributing lime, fertilizer and like comminuted material over lawns, golf courses and the like, and more particularly and specifically to a new and improved mechanism associated with such distributing apparatus for controlling the discharge of comminuted material from said apparatus.

Generally, the present invention constitutes an improvement on distributing apparatus shown and described in the prior U. S. Letters Patent No. 1,881,933 to Laurence Powell, dated October 11, 1932.

This prior patent shows a mechanism for selectively controlling the distribution flow of materials from a wheeled hopper, which includes a damming member slidably mounted on the hopper relative to discharge outlets therein, and a hand lever pivoted intermediate its length on the hopper with one end thereof having slot and pin connection with said damming member.

In this prior construction, manual reciprocation of said hand lever selectively controls the movement and positioning of the damming member relative to said discharge outlets for controlling the flow of materials between full open and full closed positions of the outlets.

It has been found that the location of the hand lever directly on the hopper renders the flow control mechanism both inconvenient and awkward to an operator of the distribution apparatus who is normally positioned at a distance spaced from the hopper determined by the length of the handle means on the apparatus.

The inaccessibility of the hand lever to the operator in this prior construction makes it necessary for the operator to stop the progress of the distributor whenever he desires to regulate the distribution flow in order to enable him to move to a point of access convenient to the hand lever.

In addition, it has been found that the use of a hand lever control mechanism of the type set forth above which is located directly on the hopper subjects the entire control mechanism to substantially continuous contact with the dusts and granulations of the material being distributed.

Because of the chemical compositions of the materials normally distributed by apparatus of the type herein described, substantial corrosion occurs in those parts of the control mechanism subjected to contact with dusts and the like of the materials distributed, resulting in deterioration and binding of the parts of the mechanism thereby making operation thereof difficult and unsatisfactory.

Certain other prior constructions of distribution apparatus of the type generally shown and described in Powell Patent No. 1,881,993 utilize hand wheels in conjunction with pulley or gear arrangements located directly on the hopper for controlling the discharge flow of materials from the hopper.

These and other prior constructions are highly disadvantageous for the same reasons and in the same manner as set forth above relative to the pivoted hand lever control mechanism described.

It is therefore a general object of the present invention to provide a control mechanism for regulation of the discharge or distribution flow of comminuted materials from distribution apparatus which substantially eliminates the numerous disadvantages and problems inherent in prior constructions.

It is a primary object of the present invention to provide a distribution flow control mechanism for comminuted material distribution apparatus which is so arranged and assembled relative to the apparatus as to have a minimum tendency of contact with the dusts, granulations and the like of the materials being distributed, thereby avoiding the chemical corrosion of working parts thereof and the resultant damage occasioned by such corrosion.

Another object of the present invention resides in the provision of control mechanism for regulating the flow of comminuted materials from distribution apparatus which is so arranged as to locate the control mechanism at a point of convenient access to the operator of the apparatus in his normal position or location of operation.

Still another and important object of the present invention lies in the provision of control mechanism of the type set forth which is of extremely strong, durable and long lasting construction and which is of nominal cost of manufacture.

These and other objects are accomplished by the parts, constructions, arrangements, combination and subcombinations comprising the present invention, the nature of which is set forth in the following general statement, and preferred embodiments of which, illustrative of the best modes in which applicant has contemplated applying the principles, are set forth in the following description and illustrated in the accompanying drawings, and which are particularly and distinctly pointed out and set forth in the appended claims forming a part hereof.

In general terms, the present invention may be defined as including a hopper member journaled on wheels for rotatable support and movement over the ground, the hopper having a series of discharge outlets in the region of its bottom portion for discharging comminuted materials, damming means acting to regulate the flow of comminuted material outwardly of the discharge outlets, a handle or handle bar means secured at one end to the hopper and extending upwardly and angularly therefrom, a crank rod rotatably supported from and generally along the length of the handle means, the crank portion of said crank rod having oscillatory engagement with said damming means, and manual, selectively controlled means on the extended portion of the handle for rotating said crank rod in selectively precontrolled amounts to oscillate the crank portion of said rod and to actuate said damming means, whereby the movement and positioning of said damming means is readily controllable to regulate and control the discharge of comminuted materials from the discharge outlets in said hopper.

Preferred embodiments of the improvements constituting the instant inventions are illustrated in the accompanying drawing, in which:

Figure 1 is a perspective view of one form of the distributing apparatus constituting the instant invention;

Fig. 2 is a perspective view of a modified form of the distributing apparatus;

Fig. 3 is a partial elevation of the apparatus hopper, discharge outlets, and damming means;

Fig. 4 is a partial, vertical section, taken on line 4—4, Fig. 3;

Fig. 5 is a vertical section, taken on line 5—5, Fig. 1; and

Fig. 6 is a vertical section, taken on line 6—6, Fig. 2.

In the accompanying drawings similar numerals indicate similar parts throughout the several views.

Referring now to Fig. 1, wherein a form of distribution apparatus, indicated generally at 10, preferably includes a storage bin or hopper 11 formed of sheet material and having an open top 12. The hopper 11 is of substantially V-shape in cross section with the angular walls 13 and 14 being generally disposed front and rear respectively.

The lower end of the hopper 11 is journaled upon a horizontally disposed axle shaft 15 which shaft in turn is supported at each end thereof beyond the ends of said hopper by wheels 16 affixed thereto. The axle shaft 15 passes through the bottom portion of the hopper, at a spaced distance above the bottom thereof, and is journaled in the end walls 17 of the hopper.

An agitator or feed member 18 is secured to the shaft 15, within the hopper, to extend substantially the full width of the hopper. This agitator member 18 is preferably formed by a central, elongated hub having radially extending blades therefrom which will cause sufficient turbulence of the material 19 within the hopper to discharge the material outwardly through a plurality of laterally arranged and spaced discharge outlets 20 formed in the lower portion of the back wall 14 of the hopper.

As the material 19 is discharged through the outlets 20 it will fall onto a distributing plate 21a, supported rearwardly of the bottom wall of the hopper, and the distributing plate 21a will tend to scatter and uniformly distribute the material upon the surface over which the hopper is moved.

Associated with the discharge outlets, on the rear wall 14 of the hopper member, is a damming member 21 which takes the form of an elongated plate element provided with openings 22 therein arranged at intervals therealong equal to the spaced intervals between discharge outlets 20 in the rear wall 14 of the hopper.

The damming member 21 is positioned flush against the rear wall 14 of the hopper, with the openings 22 therein in vertical coincidence with the opening discharge outlets 20 in the wall, and the damming member 21 is positioned slidably laterally of the rear wall in the aforedescribed position by a guide and support member 23 which is secured laterally of the bottom end of the rear wall 14 and which supports the lowermost edge of the damming member, and by a plurality of laterally spaced ears 24 which are secured above the top edge of the damming member 21 with offset lug portions 25 extending downwardly for a spaced distance over the outer face of the damming member at its upper edge to slidably retain the upper end thereof flush with the rear wall 14.

Originating at laterally spaced positions on the upper end of the rear wall 14 is a U-shaped handle member 26 formed of angle stock which extends upwardly and rearwardly from the rear wall of the hopper to an extended position therefrom at which point a handle bar 26a is secured horizontally crosswise of the handle.

The handle construction 26 may preferably include integrally extended leg portions 27 disposed angularly thereto and bridging the open top of the hopper in parallel relationship and at laterally spaced intervals to form strengthening braces for the hopper to maintain it in its formed configuration.

Additionally, a generally U-shaped member 28 of angle stock may be secured at the ends of the leg portions thereof to the spaced legs of the handle member 26, at points thereon adjacent the hopper, to extend downwardly at an angle therefrom forming a support leg to maintain the hopper, together with the wheels, in a generally upright position when it is not in use.

Associated with the damming member 21 is a control mechanism for regulating the movement and positioning of the damming member laterally of the hopper and relative to the discharge outlets 20 in the rear wall thereof.

This control mechanism includes a crank rod 29 having an offset crank portion 30 at one extremity thereof. The crank rod 29 is positioned with the crank portion 30 thereof in engagement downwardly into a U-shaped socket 31 affixed to the upper portion of the damming member 21 substantially centrally of the ends thereof, with the second end of the crank rod terminating adjacent the handle bar 26a on the extended end of the handle 26. The crank rod 29 may be provided with a turnbuckle construction 30a intermediate its length for longitudinal adjustment.

An L-shaped bracket 32, supported on the rear wall 14 of the hopper at a point above the damming member, receives the crank member rotatably therethrough to journal the crank for rotation therein, and the crank rod is additionally journaled by a pair of strap members 33, which are supported generally in opposition from the legs of the handle member, the adjacent ends of said strap members forming aligned bearing supports 32a for said rod.

Referring to Fig. 5, the extended end of the crank rod 29 is fixedly secured in a plate member 34 which is of a general quadrant configuration and wherein the rod is received and fixed at a point adjacent the apex of said plate.

The plate member 34 is provided at a point remote to the rod attachment thereto with an arcuate slot 35 formed therein to extend to points of termination adjacent the radial edges of the plate.

A second plate member 36, of general quadrant configuration, is secured to the handle bar 26a to extend in flush juxtaposition with the underside of the plate 34. Plate 36 is provided with an arcuate slot 37 therein which lies directly beneath slot 35 of plate 34 and extends to terminate at each end thereof at points coincident with the extremities of slot 35.

The slot 37 in plate 36 is of greater lateral measurement than slot 35 thereby forming a shoulder 38 within said slot at the point juxtaposition of the plates 34 and 36. A shoulder bolt 39 is inserted upwardly through the slot 37 in plate 36 with the shoulder portion of the bolt abutting on shoulder 38 in said slot and with the bolt portion 40 thereof extending outwardly beyond the upper face of the plate 34.

The extended end portion of the bolt 40 receives a washer 41 thereon of greater diameter than the lateral breadth of the slot 35, and a wing nut 42 is engaged on the extended end portion of the bolt 40 externally of the washer.

To operate the control mechanism for regulation of the flow of material from the discharge outlets 20 in the hopper, it is necessary to oscillate the quadrant-shaped plate 34 slidably upon the plate 36 to cause rotation of the crank rod 29 which is fixedly secured in said plate. Rotation of the crank rod 29 will in turn cause oscillation of the crank portion 30 thereof within the U-shaped bracket 31 on the damming member 21.

Oscillation of the crank portion 30, within the U-shaped socket 31, will cause lateral sliding movement of the damming member 21 thus bringing the openings 22 in the damming member into and out of registry with the discharge outlets 20 therebeneath.

In order to permit selective control of the discharge flow, a scale indicia 43 may be applied to the upper face of the plate member 34 along the slots 35 in predetermined increments computed to accord with the relative movement of the damming member 21.

Thus, by loosening the wing nut 42 and sliding the shoulder bolt assembly to the extreme left end of the aligned arcuate slots 35 and 37, and then tightening said wing nut in such a position, the wing nut may be used as a finger grip to rotate the outer plate 34 from the extreme left position to the right until the shoulder portion of the shoulder bolt 39 abuts with the right end extremity of the arcuate slot 37 in the plate 36.

Such movement of the plate 34 and shoulder bolt 39, from one extremity of arcuate slot 37 to the other extremity thereof, will result in movement of the damming member from a full closed position to a full open position with respect to discharge outlets 20.

In like manner, positioning and locking of the wing nut 40 at any of the indicated increments intermediate the extremities of the arcuate slot permits opening of the discharge outlets within any of the precomputed degrees as indicated by the scale 43.

Referring now to Fig. 2, wherein there is shown a modification of the present control apparatus, there is indicated a second distributing apparatus 10, wherein the hopper construction 11 and associated discharge outlets 20 and damming member construction 21 are identical with that shown in Figs. 1 through 5 and described above, with the exception of the handle construction and the control means for movement of the damming member mounted on said handle.

In this modified construction, a single piece of angle stock 44 is secured flush with a portion of the rear wall 14 of the hopper and the lower end portion of this angle stock is turned downwardly and rearwardly at an angle to form a foot member or brace 45 to support the hopper, together with the wheels 16 thereof, in upright position when not in use, and the other end of the angle stock 44 is turned outwardly and upwardly as at 46 to form a handle brace member.

A straight handle bar element 47, usually of wood, is secured as at 48 to extend upwardly and outwardly from the upper, outermost extremity of the brace member 46. Associated with the handle member 47 is a single plate member 49, of general quadrant configuration, to which the outer extremity of the crank rod 29 is fixed at a point adjacent the apex of said plate.

In this modified form, the crank rod member 29 is journaled at two points 50 and 51, intermediate its length, by suitable supports, and the lower end thereof terminates in the identical crank portion 30 having oscillatory engagement in the identical U-shaped socket 31 on the damming member 21.

The plate member 49 is provided with an arcuate slot 52 therein substantially identical in all respects with the slot 35 described with respect to plate member 34. The plate member 49 is also provided with an additional slot 53, of substantially greater lateral breadth than the slot 52, which is formed arcuately in the plate intermediate the fixed attachment of the rod 29 at the apex thereof and the remote slot 52.

As is seen more clearly in Fig. 6, the enlarged slot 53 receives the extended handle 47 slidably therethrough and in a manner whereby the plate may be rotated with the slot slidably engaging said handle. Located immediately beneath the plate member 49 is a stop finger 54, which is rotatably supported at one end on the crank rod 29 as at 55 to extend therefrom outwardly to a point immediately beneath the arcuate slot 52 in the plate 49.

A shoulder bolt 56, with the shoulder portion thereof abutting the underside of the stop finger 54, is extended upwardly through the stop finger 54 to extend through the slot member 52 and for a distance thereabove, and the extended portion of the shoulder bolt 56, above the plate 49, receives a washer 57 and wing nut 58 thereon. Thus, the extended end of the stop finger 54 is fixed with the shoulder bolt to move therewith as the shoulder bolt is moved arcuately within the limits of the extremities of arcuate slot 52.

The plate 49, in the same manner as plate 34, may carry a scale indicia thereon, adjacent the slot 52, whereby the wing nut may be loosened and moved to a point adjacent any of the precomputed increments of the scale and tightened in that position to lock the plate 49 and the stop finger 54 together as a single unit. Then, using the wing nut 58 as a finger grip, the plate and stop finger 54 may be rotated from left to right until the stop finger 54 abuts with the handle portion 47 in that region where the stop finger extends beneath the arcuate slot 53.

Accordingly, it may be seen in this modified construction that the damming member 21 may be moved within precalculated limitations from full open to full closed position, or to any preselected positions intermediate the full closed or full open position.

From the foregoing, it is seen that a new and improved control mechanism for regulating the flow of comminuted material from a discharge apparatus has been provided which permits control of the flow from a convenient and readily accessible point on the extended portion of the handle, adjacent the normal location of an operator, thereby avoiding inconvenience and awkwardness in such control.

Further, the present construction manifestly provides for an arrangement and assembly which substantially eliminates close fittings and rotating attachments in regions where they would be subject to contact by the dusts, granulations and the like of the materials being distributed. Additionally, the associated mechanism constituting the present invention are of strong, durable and long lasting construction, as well as constructions capable of low cost manufacture.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention, the construction, the operation and use of preferred embodiments thereof, and the advantageous new and useful results obtained thereby; the new and useful constructions, and reasonable mechanical equivalents thereof obvious to those skilled in the art, are set forth in the appended claims.

I claim:

1. Apparatus for distributing comminuted materials including, walls forming a material hopper, one of said hopper walls being provided with material discharge outlets therein, a damming member slidably mounted on said hopper for opening and closing movement relative to said discharge outlets, a crank rod having operative connection with said slidable damming member, handle means secured to and extending from said hopper, said crank rod rotatably supported from and along the length of said handle means, a plate member secured upon the outer end portion of the crank rod and having an arcuate slot therein, a stop member selectively adjustable in said arcuate slot, and a fixed stop upon the handle engageable with said adjustable stop member, whereby rotation of said plate and crank rod may be controlled within preselected limitations.

2. In apparatus for distributing comminuted materials comprising a hopper having material discharge outlets in a portion thereof, a damming member slidably mounted on said hopper for opening and closing movement relative to said discharge outlets, and a handle member extending angularly upwardly from said hopper, a control mechanism for selectively moving and positioning said damming member relative to said discharge outlets including, an elongated crank rod rotatably supported from and along the length of the handle member, the crank portion of said rod having oscillatory engagement with said damming member, and means on said extended handle member for selective rotation of said crank rod and oscillation of said crank, whereby said damming member may be selectively moved and positioned relative to said discharge outlets, said means including a quadrant plate fixed to the extended end of the crank rod, there being an arcuate slot in said quadrant plate, an adjustable stop means including a shoulder bolt located through said arcuate slot, and a fixed stop upon the handle and engageable by said adjustable stop means.

3. Control mechanism for regulating the flow of comminuted material from discharge outlets in a hopper including a damming member slidably mounted on said hopper relative to said outlets, an elongated crank rod having an offset crank portion at one end thereof, said crank rod being rotatably mounted in an extended position from said hopper, a socket member on said damming member, the crank portion of said crank rod engaged in said socket member, a handle fixed stop means on the handle and a plate member fixed upon the crank rod and having an adjustable stop member thereon for manually selectively rotating said crank rod, whereby movement and positioning of said damming member relative to said discharge outlets is selectively controlled.

4. Control mechanism for regulating the flow of comminuted material from discharge outlets in a hopper including a damming member slidably mounted on said hopper relative to said outlets, an elongated crank rod having an offset crank portion at one end thereof, said crank rod being rotatably mounted in an extended position from said hopper, a socket member on said damming member, the crank portion of said crank rod engaged in said socket member, a flat plate member fixed eccentrically to the extended end of said crank rod, an adjustable stop member on said plate remote to the point of attachment of said crank rod thereto, and a fixed stop member supported adjacent said plate member and engageable with said adjustable stop to selectively limit rotation of said plate and said crank rod, whereby the movement and positioning of said damming member relative to said discharge outlets is controllable from a point remote to said hopper.

5. Control mechanism for regulating the flow of comminuted material from discharge outlets in a hopper including a damming member slidably mounted on said hopper relative to said outlets, an elongated crank rod having an offset crank portion at one end thereof, said crank rod being rotatably mounted in an extended position from said hopper, a socket member on said damming member, the crank portion of said crank rod engaged in said socket member, a flat plate member taking the form of a quadrant, the extended end of said crank rod having fixed attachment to said plate at the apex of said plate, an arcuate slot in said plate remote to the apex thereof, a stop member selectively adjustable in and extending for a spaced distance below said arcuate slot, a second plate member supported in fixed juxtaposition beneath the first named plate member, and an arcuate slot in said second named plate member in vertical coincidence with the slot in said first named plate member and slidably receiving the extended portion of said adjustable stop means, whereby the extremities of said second named slot form fixed stops engageable by the adjustable stop in said first named plate to limit rotation of the plate and rod within preselected adjustments.

6. In combination with a handle member extending from a material distributing hopper having discharge outlets and a damming member movable thereon relative to said outlets, an elongated crank rod rotatably supported along the length of said handle and having oscillatory operable connection with said movable damming member, a plate member taking the form of a quadrant, the rod member having fixed attachment with said plate at the apex of said plate, a stop member selectively adjustably mounted upon said plate member and a fixed stop member supported adjacent said plate member and engageable with said adjustable stop member for selectively limiting the rotation of said plate and said rod, whereby the movement and positioning of said damming member relative to said discharge outlets may be controlled within preselected limitations.

7. In combination with a handle member extending from a material distributing hopper having discharge outlets and a damming member movable thereon relative to said outlets, an elongated crank rod rotatably supported along the length of said handle and having oscillatory operable connection with said movable damming member, a plate member taking the form of a quadrant, the end of said rod remote to said damming member having fixed attachment to said plate member at the apex thereof, an arcuate slot in said plate remote to the apex thereof, an adjustable stop member in said arcuate slot, and a fixed stop member engageable with said adjustable stop member, whereby rotation of said plate and crank rod may be controlled within preselected limitations.

8. In combination with a handle member extending from a material distributing hopper having discharge outlets and a damming member movable thereon relative to said outlets, an elongated crank rod rotatably supported along the length of said handle and having oscillatory operable connection with said movable damming member, a plate member taking the form of a quadrant, the end of said rod remote to said damming member having fixed attachment to said plate member at the apex thereof, an arcuate slot in said plate remote to the apex thereof, a stop member selectively adjustable in and extending below said arcuate slot, a second plate member fixed on said handle in juxtaposition beneath the first named plate member, and an arcuate slot in said second plate member in alignment beneath the first named slot and slidably receiving an extended portion of said adjustable stop member therein, whereby the extremities of the second slot form fixed stops engageable with the adjustable stop in said first named plate to limit rotation of said first named plate and crank rod relative to said fixed second named plate.

9. In combination with a handle member extending from a material distributing hopper having discharge outlets and a damming member movable thereon relative to said outlets, an elongated crank rod rotatably supported along the length of said handle and having oscillatory operable connection with said movable damming member, a plate member taking the form of a quadrant, the end of said rod remote to said damming member having fixed attachment to said plate member at the apex thereof, an arcuate slot in said plate remote to the apex thereof, a second arcuate slot in said plate member intermediate the first named slot and the apex of said plate, said second named slot receiving said handle therethrough and slidable along the length thereof, a stop finger pivoted at the apex of said plate and extending in juxtaposition therebeneath and underlying said first and second named slots in said plate, and bolt means engaging said stop finger and extending upwardly through said first named slot means in said plate, and adjustable nut means on that portion of the bolt extending above said slot for selectively locking said stop finger in preselected positions arcuately of said slot, whereby said stop finger may be adjusted in preselected spacing from said handle means to limit oscillation of said plate and rotation of said rod relative to said handle.

10. In apparatus for distributing comminuted materials comprising a hopper having material discharge outlets in a portion thereof, a damming member slidably mounted on said hopper for opening and closing movement relative to said discharge outlets, and a handle member extending angularly upwardly from said hopper, a control mechanism for selectively moving and positioning said damming member relative to said discharge outlets including, an elongated crank rod rotatably supported from and along the length of the handle member, the crank portion of said rod having oscillatory engagement with said damming member, and means on said extended handle member for selective rotation of said crank rod and oscillation of said crank, whereby said damming member may be selectively moved and positioned relative to said discharge outlets, said last named means comprising a plate member secured upon said crank rod, an adjustable stop member supported on said plate member, and a fixed stop member located adjacent said plate member and engageable with said adjustable stop member, whereby said plate member and said crank rod member may be rotated within the limits of contact between said adjustable and fixed stop members.

References Cited in the file of this patent

UNITED STATES PATENTS

| | | |
|---|---|---|
| 464,399 | Stewart | Dec. 1, 1891 |
| 2,624,492 | Seltzer | Jan. 6, 1953 |